(12) United States Patent
Maze et al.

(10) Patent No.: US 7,716,302 B2
(45) Date of Patent: May 11, 2010

(54) METHOD OF ACCESSING AND SHARING A DIGITAL DOCUMENT IN P2P COMMUNICATION NETWORK

(75) Inventors: Frederic Maze, Langan (FR); Pascal Viger, Coesmes (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 10/893,012

(22) Filed: Jul. 16, 2004

(65) Prior Publication Data

US 2005/0044483 A1 Feb. 24, 2005

(30) Foreign Application Priority Data

Jul. 18, 2003 (FR) .................................. 03 08807

(51) Int. Cl.
*G06F 15/16* (2006.01)
(52) U.S. Cl. ........................................ 709/217; 709/203
(58) Field of Classification Search ................. 709/203, 709/224, 228, 229, 238, 217
See application file for complete search history.

(56) References Cited

U.S. PATENT DOCUMENTS

| 6,282,709 B1 * | 8/2001 | Reha et al. ................... 717/175 |
| 6,374,289 B2 * | 4/2002 | Delaney et al. ............. 709/203 |
| 6,975,419 B2 | 12/2005 | Staas et al. |
| 2002/0184318 A1 | 12/2002 | Pineau |
| 2003/0074403 A1 * | 4/2003 | Harrow et al. .............. 709/203 |
| 2004/0184478 A1 | 9/2004 | Donescu et al. ............. 370/462 |

FOREIGN PATENT DOCUMENTS

| EP | 0 993 163 | | 4/2000 |
| EP | 993163 A1 | * | 4/2000 |
| EP | 1 229 442 | | 8/2002 |
| JP | 2005-520221 | | 7/2005 |
| WO | 02/103983 | | 12/2002 |

OTHER PUBLICATIONS

N. Craighill, et al., "WebObjects—Tools and Techniques", Apple Computer WebObjects 4.0 Documentation, Online 1998, pp. 57-58, <URL:http://developer.apple.com/documentation/LegacyTechnologies/WebObjects/WebObjects_4.0/System/Documentation/Developer/WebObjects?WOTools/WOToolsandTech.pdf>.
U.S. Appl. No. 10/857,884, filed Jun. 2, 2004.

* cited by examiner

*Primary Examiner*—Ramy M Osman
*Assistant Examiner*—Marshall McLeod
(74) *Attorney, Agent, or Firm*—Fitzpatrick, Cella, Harper & Scinto (57) ABSTRACT

The access method comprises the following steps:
  i) receiving a notification indicating the presence of at least one digital document available on the network, said notification comprising at least one executable command adapted to detect whether the recipient client device comprises a local application capable of processing the digital document,
  ii) executing the command or commands in order to detect the local application, and
  iii) in case of positive detection, accessing the digital document from a local server whereas in case of negative detection, accessing the document from the address of a remote server.

22 Claims, 5 Drawing Sheets

METHOD OF ACCESSING AND SHARING A DIGITAL DOCUMENT IN P2P COMMUNICATION NETWORK

BACKGROUND OF THE INVENTION

The present invention relates to accessing and/or sharing a digital document available in a communication network linking client devices together, said method utilizing a notification indicating the presence of a digital document available on the network, the notification being suitable for adaptation and for exploiting the presence or not of a local application able to process the digital document.

It has general application in the processing of digital documents available in a communication network, in particular communication networks of peer-to-peer type, designated hereinafter by the acronym P2P.

P2P communication systems have emerged in recent years constituting a revolution in file sharing in comparison with the conventional client-server model. In P2P systems, each machine (also termed node or peer) constituting the communication network acts as a client device as well as a server device. Thus, in a P2P network, the apparatuses put resources in common according to a philosophy of sharing as coequals, each machine of a P2P network acting both as client and as server. Such networks are thus distinguished from conventional client-server networks in which the resources are archived in a central server device.

Currently, the distribution of data relies increasingly on P2P networks due to their low-cost installation, the presence of very numerous computers connected to the networks, and due to the development of broadband connections.

However, P2P networks are unstable. This is because client devices (and consequently server devices) connect and disconnect periodically to the network, thus rendering the presence of data highly unpredictable. Furthermore, the addresses of client and/or server devices are unpredictable and liable to be different at each connection.

Due to their specificity, P2P systems generally imply the utilization of a local, dedicated client application, also termed a P2P local application. Such a P2P local application ensures the sharing of digital content, as well as searching and accessing the digital content available on P2P networks.

For example, the P2P local application may provide a notification mechanism based on the exchange of messages according to a proprietary protocol in order to enable a client device to notify one or more persons that it has just shared new digital contents on the network.

The P2P local application may also utilize electronic mail as a main mechanism for notification or as a supplement to the proprietary notification system. In this case, the electronic mail may possibly contain one or more specific files as attachments which may be interpreted by the P2P local application at the recipient or recipients.

P2P systems are also known which enable users not having any P2P local application to access the content on the network with the aid of Internet access tools that are more conventional and widespread such as browsers or Internet navigators.

In such systems, certain specific server devices or client devices in the network act as server devices playing the role of gateway between the Internet access tool (browser, explorer, navigator) and the P2P network. These machines may be viewed as proxy devices which take on the task of retrieving the resource sought on the P2P network for the Internet tool. In these systems, email is utilized conventionally as a notification mechanism. The email may then contain a page in markup language or a link (also termed a URL from "Uniform Ressource Locator") to a page enabling the recipient user to access the resources.

Thus, in a P2P system, a user may utilize a P2P local application to share digital content over the network, and to browse and access the content available on the P2P network.

The user not having the P2P local application or the user not wishing to utilize the interface provided may also utilize tools capable of viewing pages in markup language to access the digital content (Web explorer, email reader, or any other application capable of displaying pages in markup language).

For example, the user may share collections of digital content with a group of persons, it being possible for those persons to have the P2P local application or not.

The Applicant set itself the problem of providing a method enabling recipient client devices to be notified in a uniform manner without having to know a priori whether said recipients posses a P2P local application dedicated to the processing of digital documents.

SUMMARY OF THE INVENTION

A solution to this problem is precisely what the present invention provides.

It relates to a method of accessing at least one digital document available on a communication network linking client devices together, said accessing method being implemented on a recipient client device.

According to a general definition of the invention, the method comprises the following steps:

i) receiving a notification indicating the presence of at least one digital document available on the network, said notification comprising at least one executable command adapted to detect whether the recipient client device comprises a local application capable of processing the digital document;

ii) executing the command or commands in order to detect the presence and activation of the local application; and iii) in case a local application is present and active, accessing the digital document from a local server whereas in case of absence or inactivity of the local application, accessing the document from a remote server.

Thus, the method uniformly notifies the users of a network who posses or do not posses the local application. More particularly, the method optimizes the utilization of the network via the notification by seeking to enable the utilization of the local application to view digital documents as soon as that application is available with a user while remaining compatible with those who do not posses that local application.

Thus, provision is made to modify the information contained in the notification at the time of its viewing depending on the presence or not of the local application with the recipient.

In practice, the notification further comprises a page in markup language containing at least one identifier designating the digital document, and a remote address designating a remote server.

According to one embodiment, the method further comprises, at the issue of step ii) and prior to step iii), the step iia) in which, in case a local application is present and inactive, provision is made to proceed with the activation of the local application further to an authorization by the user of the recipient client device granted in response to a chosen executable command.

As a variant, at the issue of step ii) and prior to step iii), the method further comprises the step iib) in which, in case a local application is present and inactive, provision is made to proceed automatically with the activation of the local application in accordance with a chosen executable command.

According to another embodiment, the method further comprises, after step iii), the step iv) in which, in case a local application is present and active, provision is made to verify the presence of the document on a local server, and in case of negative verification to search for said document on the network, to download it in case of positive search, and to save it locally before serving it in response to the request for access.

According to another embodiment, in case a local application is present and active, provision is made to locally adapt the page in markup language so as to access the document from the address of a local server. In practice, the adaptation of the page comprises the setting of a linking variable in markup language to the address of a local server.

According to still another embodiment, in case a local application is absent or inactive, provision is made to locally adapt the page in markup language so as to access the document from the address of a remote server. In practice, the adaptation of the page comprises the setting of a linking variable in markup language to the address of a remote server.

In practice, the communication network is of peer-to-peer type, centralized, decentralized, or hybrid.

For example the page may be written in markup language of HTML type or similar, or the commands included in the page in markup language calling on a local program of activeX type or similar, adapted to determine the presence and activation of a local server, as well as to retrieve the configuration parameters of said local server.

For example, the executable command or commands may be of Script program type such as Java Script or VB Script, the said command or commands being embedded in the page thus notified.

For example, the local address designating a local server may be determined by the Script program adapted to retrieve the configuration parameters of said local server.

The command further comprises a function adapted to link a local or remote address enabling the document to be accessed.

In practice, the page is notified as an attachment with an email.

According to a variant form, the page is downloaded onto a chosen remote server and a reference to that page is sent to any recipient to be notified, the reference of the page being, for example, of URL type, included in an email.

The present invention also relates to a method of sharing a digital document in a communication network linking client devices together, said method being implemented on a sending client device.

According to another aspect of the invention, the method comprises the following step:

sending to at least one recipient client device a notification indicating the presence of at least one digital document available on the network, said notification comprising at least one executable command adapted to detect whether the recipient client device comprises a local application capable of processing the digital document, and in case a local application is present and active, to access the document from the address of a local server otherwise to access the document from the address of a remote server.

The present invention also relates to a device for accessing at least one digital document adapted to implement the accessing method according to the invention.

Similarly, the present invention also relates to a device for sharing a digital document adapted to implement the method of sharing mentioned above.

The present invention also relates to an information carrier readable by a computer system, possibly wholly or partly removable, in particular a CD-ROM or magnetic medium, such as a hard disk or a diskette, or a transmissible medium, such as an electrical or optical signal, characterized in that it comprises instructions of a computer program enabling the implementation of the method according to the invention, when the program is loaded and run by a computer system.

Finally, the present invention also relates to a computer program stored on an information carrier, said program comprising instructions enabling the implementation of a processing method in accordance with the invention, when that program is loaded and run by a computer system.

BRIEF DESCRIPTION OF THE DRAWINGS

Other features and advantages of the invention will appear in the light of the following detailed description and drawings in which.

DETAILED DESCRIPTION OF THE INVENTION

Figure 1:
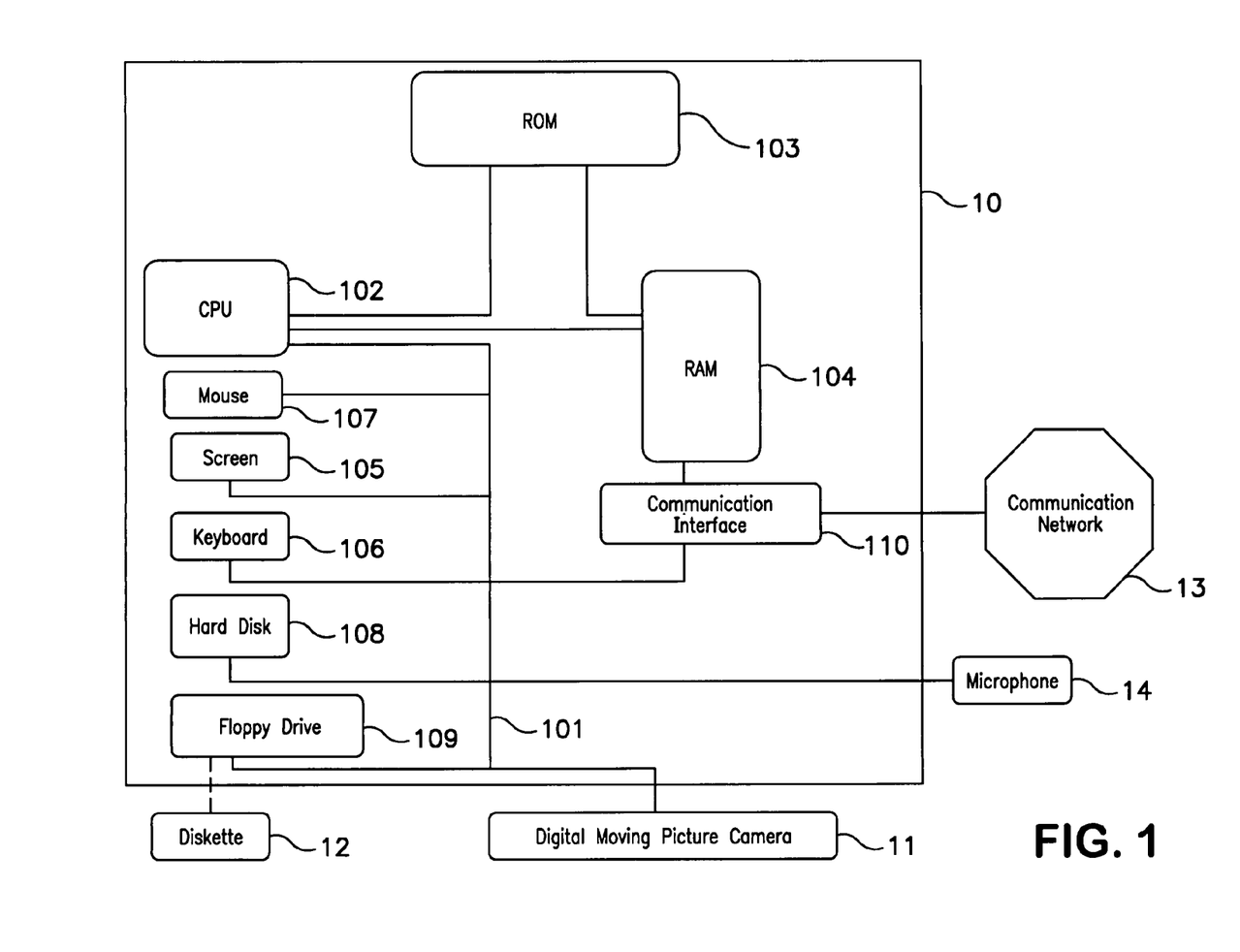
FIG. 1 is a diagram of the essential elements of a recipient client device adapted to implement the accessing method according to the invention.

With reference to FIG. 1, an apparatus implementing the invention is for example a microcomputer 10 or a workstation connected to different peripherals such as a digital moving image camera 11 (or a scanner, or any other means of acquiring or storing digital documents such as images) connected to an input/output card (not shown) and supplying multimedia data to the apparatus.

The apparatus 10 comprises a communication bus 101 to which there are connected several elements such as:

- a central processing unit 102 (microprocessor, denoted CPU in FIG. 1);
- a read only memory 103 able to contain programs according to the invention;
- a random access memory 104, which, after powering up, contains the executable code of the method according to the invention as well as registers adapted to record variables and parameters necessary for the implementation of the invention;
- a screen 105 for displaying the data and/or serving as a graphical interface with the user, who will be able to interact with the programs according to the invention, using a keyboard 106 or any other means such as a pointing device, for example a mouse 107 or an optical stylus (not shown);
- a hard disk 108 able to contain the programs according to the invention as well as data utilized or produced when the invention is implemented;
- a disk drive 109 adapted to receive a diskette 12 and to read or write thereon data processed or to be processed according to the invention; and a communication interface 110 connected to a communication network 13, the interface being adapted to transmit and receive data.

In the case of audio data, the apparatus 10 may further comprise an input/output card (not shown) connected to a microphone 14.

The communication bus 101 affords communication and interoperability between the different elements included in the apparatus 10 or connected to it. The representation of the bus is non-limiting and, in particular, the central processing is capable of communicating instructions to any element of the apparatus 10 directly or by the intermediary of another element of the apparatus 10.

The diskettes 12 can be replaced by any information carrier such as a compact disc (CD-ROM) rewritable or not, a ZIP disk or a memory card.

Generally, an information storage means, which can be read by a micro-computer or microprocessor, integrated or not into the device, and which may possibly be removable, is adapted to store one or more programs whose execution permits the implementation of the method according to the invention The executable code enabling the apparatus to implement the invention, may equally well be stored in read only memory 103, on the hard disk 108 or on a removable digital medium such as a diskette 12 as described earlier.

According to a variant, the executable code of the programs may be received by the intermediary of the communication network 13, via the interface 110, to be stored in one of the storage means of the apparatus 10 before being run (such as the hard disk 108).

The central processing unit 102 controls and directs the execution of the instructions or portions of software code of the program or programs according to the invention, those instructions being stored in one of the aforementioned storage means.

On powering up, the program or programs which are stored in a non-volatile memory, for example the hard disk 108 or the read-only memory 103, are transferred into the random-access memory 104 (RAM), which then contains the executable code of the program or programs according to the invention, as well as registers for storing the variables and parameters necessary for implementation of the invention.

It should be noted that the apparatus comprising the device according to the invention can also be a programmed apparatus. This apparatus then contains the code of the computer program or programs for example fixed in an application specific integrated circuit (ASIC).

Figure 2:
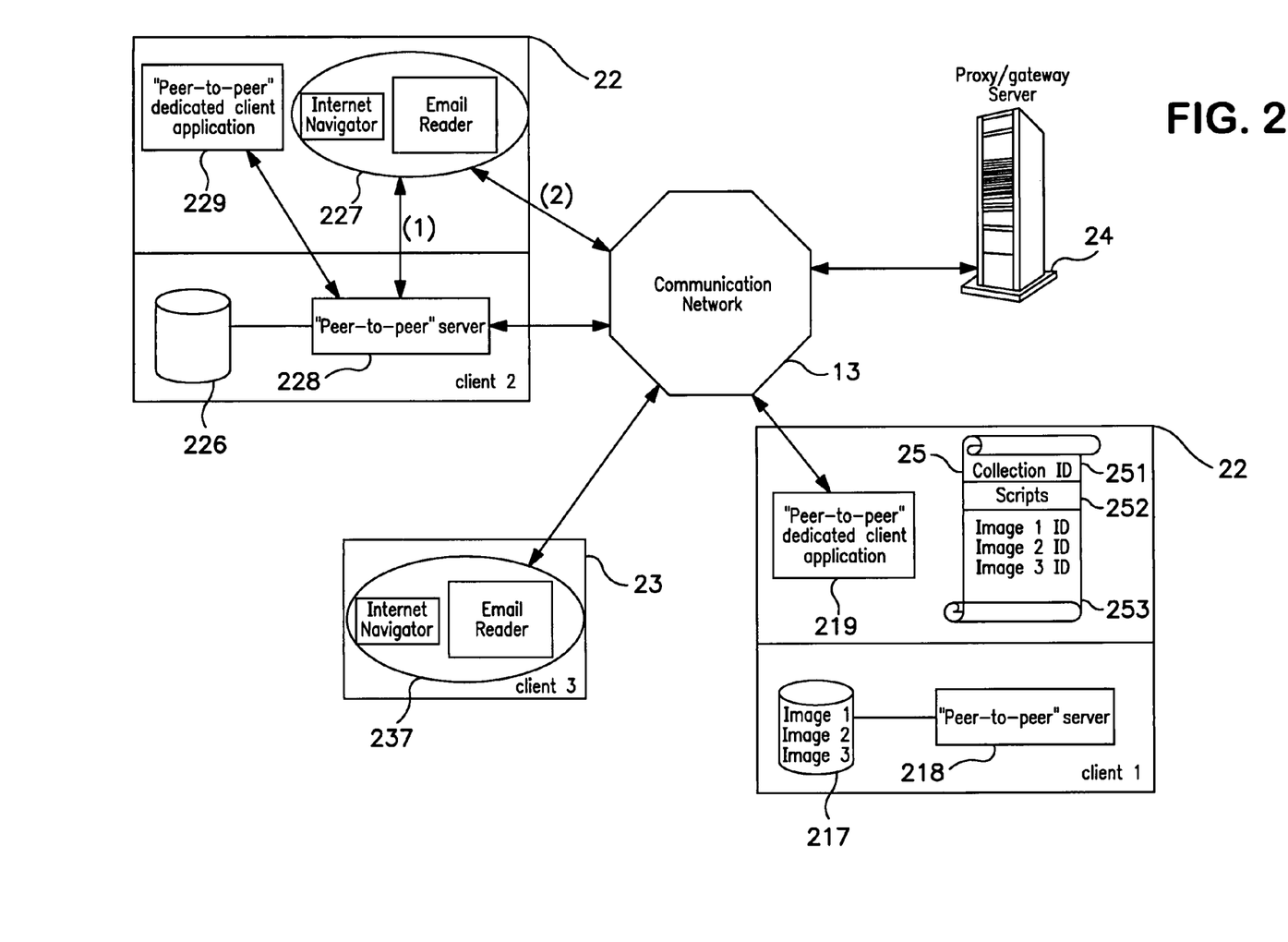
FIG. 2 is a diagram of a communication network linking client devices together according to the invention.

With reference to FIG. 2, a communication network 13 connects together several client devices or terminals, individualized as client1 21, client2 22, and client3 23. Each client device may be connected to the network 13 by different communication means such as broadband or narrow band communication means (xDSL modem, PSTN or cable). The network 13 may be constituted equally well on top of the Internet network as on top of a Local Area Network (LAN) or by a combination of both.

The terminals of the client devices fall into two distinct categories. There are either terminals provided with the dedicated "peer-to-peer" P2P application (client2 and client1) or terminals not provided with that dedicated "peer-to-peer" P2P application (client3).

The terminals provided with the dedicated "peer-to-peer" P2P application form between them a communication network of "peer-to-peer" P2P type through the communication network 13 and according to one of the topologies known to the person skilled in the art (centralized, decentralized with or without central server "superpeers" or else hybrid).

The "peer-to-peer" P2P application comprises at least one server module bearing the reference 218 in the client device 21 or the reference 228 in the client device 22. The P2P application further comprises a storage means or cache 217, 226.

The server module 218 or 228 is given the task of responding to the requests for access to the "peer-to-peer" resources. The requests may equally well come from remote applications as applications present on the same machine as the server.

The requests may equally well be received according to a proprietary protocol of the "peer-to-peer" application as according to the HTTP (the HyperText Transfer Protocol) commonly utilized on the Internet The storage means 217, 226 contains digital content shared on the "peer-to-peer" network with the aid of the server module 218, 228. The "peer-to-peer" application may also be supplemented by a P2P dedicated local client local application (219, 229) providing a interface with the user enabling him to search, access, view and share digital content on the "peer-to-peer" network.

All the terminals, whether provided or not with the dedicated "peer-to-peer" application, may also utilize tools (227, 237) capable of viewing pages in HTML type markup language to access digital content with the help of the HTTP communication protocol.

One or more specific proxy/gateway servers 24 may also be connected to the network 13, these servers offering an entry point to the "peer-to-peer" network for clients not having dedicated "peer-to-peer" clients and utilizing the HTTP communication protocol.

When they receive a request for a resource of the "peer-to-peer" network, the proxy servers 24 determine one or more machines of the "peer-to-peer" network liable to have the requested resource and take on the task either of redirecting the requester to one of those machines, or of retrieving the resource from one of those machines on behalf of the requester to then serve it to the requester as a proxy type server.

It should be noted that this role of proxy/gateway server may also be fulfilled by the client devices themselves if they have a dedicated "peer-to-peer" application, such as the client devices 1 and 2 respectively numbered 21 and 22.

According to the invention, if the user connected to machine 21 wishes to share a new collection of digital content composed of images individualized as image1, image2 and image3 present on its disk 217 with clients 22 and 23, he utilizes the P2P local application 219 to create and share a new collection composed of those three images.

During sharing, the P2P local application 219 associates a unique identifier Image1 ID, Image2 ID, Image3 ID with each image. Tools well known to the person skilled in the art make it possible to generate identifiers with an infinitesimal probability of duplication.

After the actual sharing operation that is specific to the "peer-to-peer" application, the P2P local application 219 generates a page 25 in HTML markup language describing the new collection in order to notify clients 22 and 23 that a new collection of digital content is available on the network. This HTML page contains at least some scripts 252 such as java-Scripts and a reference for each of the identifiers of newly shared digital content 253.

Once the HTML page 25 has been generated, the user may send that page to all the persons which he wishes to notify of the existence of new shared digital content (on our example client2 and client3).

In the preferred embodiment, the user sends the HTML page 25 by making it an attachment to an email.

In another embodiment, the user downloads the HTML page 25 onto a server such as server 24. Furthermore, the user sends a reference designating that HTML page on said server to all the persons he wishes to notify, for example in the form of a URL included in an email. The recipients download the HTML page 25 from the server 24 using the reference (the said URL) received as notification.

The user may equally well use any other means making it possible to transmit the HTML page to recipients (for example using a "peer-to-peer" file exchange system, by physically mailing a diskette containing the HTML, etc.).

When the HTML page 25 is received and displayed by the recipients using applications 227 and 237, that is to say an Internet navigator, an email reader or any other application capable of interpreting and displaying an HTML page, the content of the page is interpreted and the executable codes (scripts) contained in the page are executed.

A first code is given the task of determining whether the dedicated "peer-to-peer" P2P local application is installed.

If the dedicated application is installed, the first code retrieves, using a second code external to the HTML page (e.g. activeX), configuration information on the "peer-to-peer" application such as the numbers associated with network ports utilized by the application. Next, the first code initializes variables which are utilized by a third code embedded in the HTML page 25 and given the task of generating the URL addresses to utilize for accessing the digital contents.

The third code is invoked on interpretation of the HTML page for each of the references to the shared digital contents. If the "peer-to-peer" local server 228 has been detected by the first code as being installed and active, the third code returns HTML code of which the URLs are directed to the "peer-to-peer" local server (case C1 for client 2 in FIG. 2). The URLs may be of the form http://localhost:80/RUID where RUID represents the unique identifier of the shared resource.

If the "peer-to-peer" local server 228 is not present on machine 22 or is not active, the third code sends back HTML code of which the URLs are directed to a predefined remote server providing a gateway between http web requests and the "peer-to-peer" network such as the "peer-to-peer" proxy/gateway web/server 24 (case of client 3 and case C2 for client 2 in FIG. 2).

The URLs sent back may be of the form http://www.server.com/RUID where www.server.com represents the web address of server 24 and RUID represents the unique identifier of the shared resource.

The invention thus make it possible to adapt the content of the notification (HTML page 25) depending on whether the recipient has the "peer-to-peer" application or not.

In our example, device client3 23 does not have the "peer-to-peer" application. In its case, all the accesses to the shared digital contents are thus directed to the proxy server 24.

On the other hand, for device client2 22 the accesses to digital contents are directed to its "peer-to-peer" server 228 if it is active (case C1) and to the proxy server 24 if it is inactive (case C2).

The advantages of utilizing the "peer-to-peer" server as soon as it is available are in particular the fact of not accessing the network if the data are already present in the cache of the "peer-to-peer" server. In addition, if the digital contents are accessed through the "peer-to-peer" local server, said contents are then present in the cache of the server and thus may be served to remote machines in return. The number of machines in the "peer-to-peer" network able to serve a given digital content is thereby increased. As the machines may be disconnected at any moment, the probability of finding a given digital content on the network at any instant is thereby increased.

Figure 3:
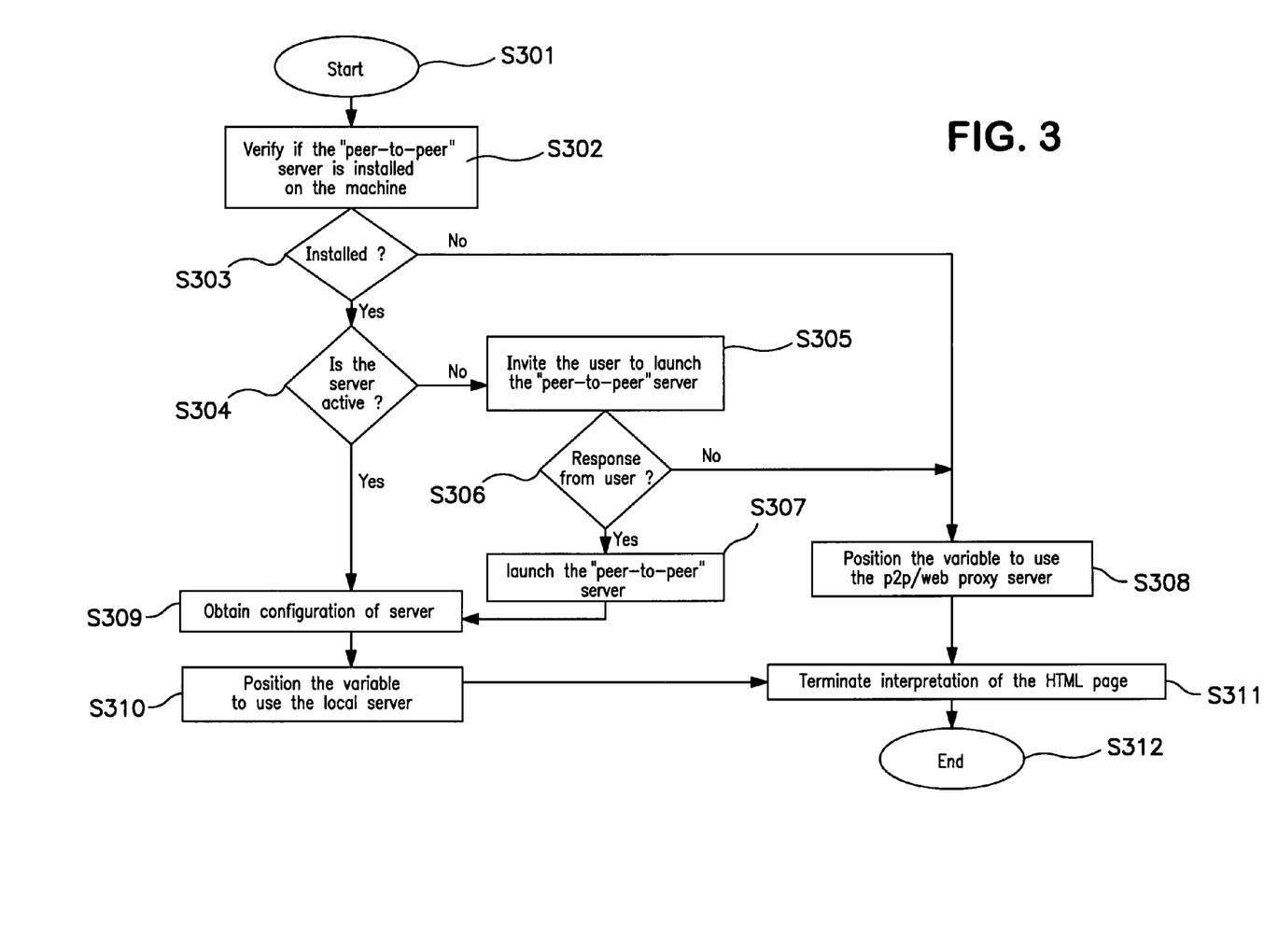
FIG. 3 is a flowchart illustrating the steps relative to the viewing of a page in markup language according to the invention.

With reference to FIG. 3, a flowchart has been represented illustrating the behavior of the script given the task of determining whether a "peer-to-peer" local server is present and active on the machine.

This script is integrated into the HTML page 25, either in the form of a script 252 bounded by HTML tags <SCRIPT LANGUAGE=###> and </SCRIPT> where ### indicates the language utilized, or in the form of a reference to an external file.

The script is interpreted and executed at each display of the HTML page.

At step S302, the script commences by verifying whether the "peer-to-peer" application is installed or not on the machine. For this, it seeks to detect the presence of an activeX program or of an extension module (plug-in) forming part of the "peer-to-peer" application.

For example, if the program to detect is an activeX, it may invoke the function defined by the following VBscript program:

```
<SCRIPT LANGUAGE="VBscript">
<!--
Function detectActiveXControl(activeXControlName)
    on error resume next
    detectActiveXControl = False
    detectActiveXControl =
    IsObject(CreateObject(activeXControlName))
End Function
rem -->
</SCRIPT>
```

This function detectActiveXControl takes as parameter the name of the activeX and gives True if the activeX is present on the machine and False otherwise.

At step S303, if the application has been detected as not present on the machine, the algorithm goes to step S308 and sets a variable indicating that in the following processing of the HTML page use must be made of the URLs directed to the remote server 24.

If, on the contrary, the P2P application has been detected, the script determines at step S304 whether the "peer-to-peer" local server 228 is currently active (that is to say in course of execution) or not. For this, it utilizes the activeX program detected at the preceding step to retrieve the current configuration of the "peer-to-peer" server 228 by consulting either the registers or a configuration file.

For example, the activeX program retrieves the number of the network port on which the server 228 is listening. If the latter is inactive, the port has the value zero. If the value is different from zero, at step S309, it sets a variable containing the port number on which the server 228 is listening.

At step S310, the script sets a variable indicating that in the following processing of the HTML page 25 use must be made of the URL addresses directed to the local server 228 to access the digital contents.

For example if GetRegValue is a function of the activeX MpActiveXVB enabling the register to be accessed, the following program may be utilized to determine whether the local server is active or not and retrieve its port number (step S304 and S309).

```
<SCRIPT LANGUAGE="JavaScript">
<!--
var IsLocalServerActive = false;
var LocalServerPort = 80;
function CheckLocalServer( )
{
  LocalServerPort =
MpActiveXVB.GetRegValue("SOFTWARE\\LocalServer\\Config\\
ListenPort}");
    if(LocalServerPort != 0)
    {
      return true;
    }
    return false;
}
IsLocalServerActive = CheckLocalServer( );
// -->
</SCRIPT>
```

If server 228 is detected as inactive at step S304, the program may invite the user to launch the "peer-to-peer" local server 228 by opening a dialog box using a function of the activeX.

If the user accepts the proposal, a function of the activeX is invoked to launch the local server at step S307.

At step S311 continuation of the interpretation of the HTML page 25 is proceeded with.

Figure 4:
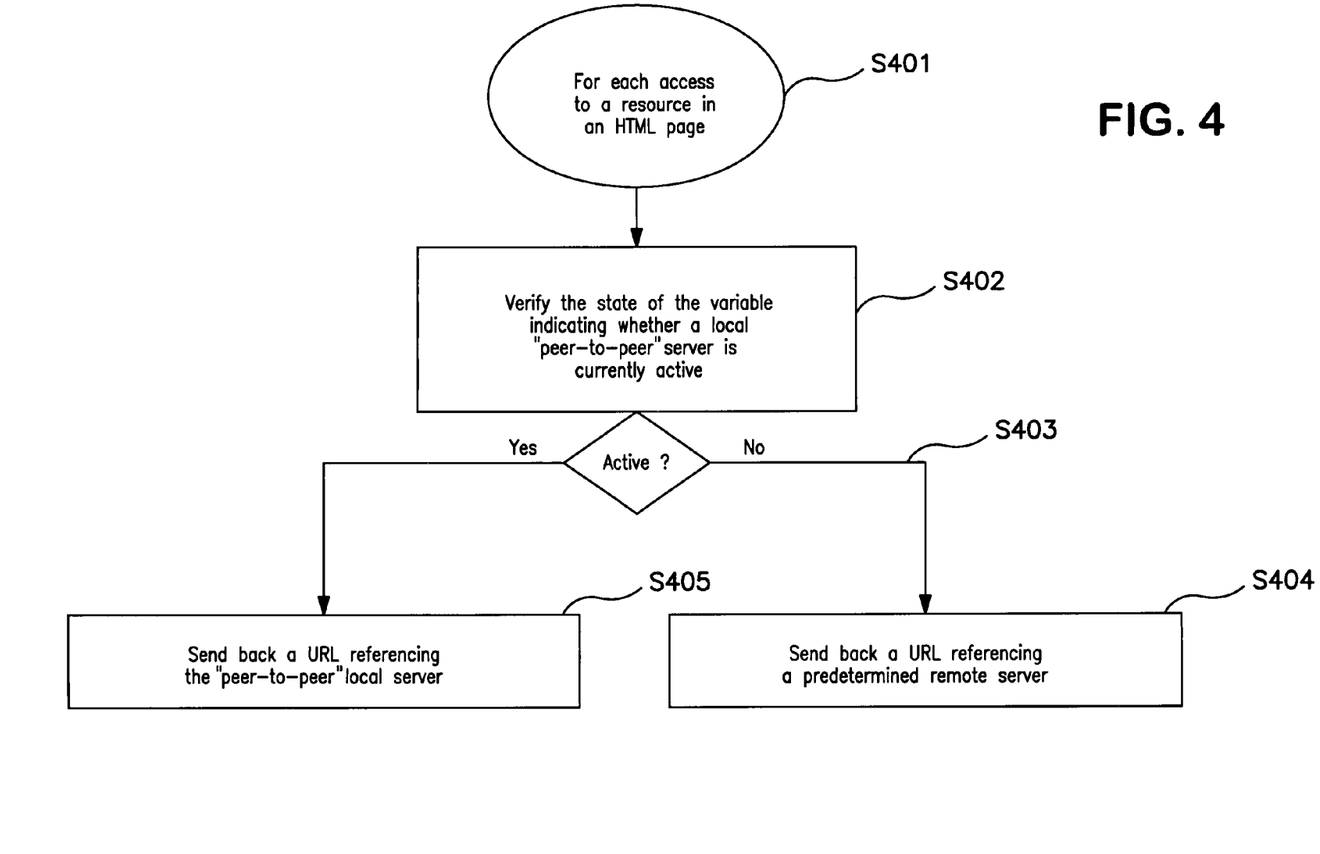
FIG. 4 is a flowchart illustrating the steps relative to the verification of the activation of the local application according to the invention.

With reference to FIG. 4, each time the HTML page 25 is analyzed by an application such as an Internet navigator or an email reader (227, 237), a JavaScript function embedded in the page is invoked for each reference to a digital content in order to give the URL address to use to access said digital content.

The invocation of that function in the HTML page may take the following form:

<SCRIPT
LANGUAGE="JavaScript">GetRessourceAddress('abcde23404-3143492ef-23232',
'blue_mountain.jpg'); </SCRIPT>

The tag <SCRIPT LANGUAGE=###> marks the beginning of a code to execute in the HTML page, where the value ### mentions the nature of the language utilized (JavaScript or VBScript for example). The tag </SCRIPT> indicates the end of the code to execute.

GetRessourceAddress here corresponds to the name of the JavaScript function to invoke. This function must be defined beforehand, either in an external file the name of which terminates with the extension ".js" itself referenced in the HTML page, or directly at the beginning of the HTML page (that is to say in the header bounded by the tags <HEAD> and </HEAD> in a section of JavaScript code bounded by the tags <SCRIPT LANGUAGE="JavaScript"> and </SCRIPT>).

In the first case, if the name of the server hosting the script is "www.server.com" and the file containing the definition of the function is called "mp.js" and is found in the "script" folder on the server, the command including the "mp.js" file in the HTML page is:

<SCRIPT LANGUAGE="JavaScript"src="http://ww-w.server.com/script/mp.js"></SCRIPT>

FIG. 4 describes the behavior of the JavaScript function GetRessourceAddress given the task of giving the URL address.

The corresponding code in JavaScript may be the following:

```
function GetRessourceAddress(resID, title)
{
  if(isLocalServerActif == false)
  {
    document.write("<A HREF=http://www.server.com/");
    document.write(resID);
  }
  else
  {
    document.write("<A HREF=http://localhost:");
    document.write(localServerHTTPPort);
    document.write("/");
    document.write(resID);
  }
  document.write(">");
  document.write(title);
  document.write("</A>");
}
```

The keyword function indicates the creation of a new function the name of which is GetRessourceAddress here and which has two variables as parameters, resID and title. JavaScript has a command named document.write(#) making it possible to display information by passing that information denoted here by hash to the program in course of interpreting the HTML page. The information passed must thus be in HTML format to be comprehensible by the interpreter.

The words isLocalServerActif and localServerHTTPPort represent JavaScript variables initialized beforehand (FIG. 3). The first variable indicates a "peer-to-peer" local server is currently installed and active on the machine and the second variable indicates the port number on which the "peer-to-peer" local server awaits.

According to the invention the algorithm is thus the following:

The JavaScript function here denoted GetRessourceAddress having as parameters at least the unique identifier of the resource denoted resID is invoked (step S401) for each of the references to the resources in the HTML page 25.

At step S402, the function verifies whether a "peer-to-peer" local server has been detected by the algorithm of FIG. 3 by verifying the value of a variable denoted here by isLocalServerActif.

At step S403, if the variable indicates that there is no "peer-to-peer" local server currently active (the value of the variable is false), then at step S404 the function gives a URL enabling the resource to be accessed via a predefined address corresponding to a server 24 of proxy/gateway type of which the name would for example be www.server.com.

On the basis of the code of the JavaScript function and the example of invocation described earlier, the HTML code given by the function is the following:

<A HREF=http://www.server.com/abcde23404-3143492ef-23232>'blue_mountain.jpg'</A>

This code represents a hypertext link having the name blue_mountain.jpg and linking to the address http://www.server.com/abcde23404-3143492ef-23232.

Figure 5:
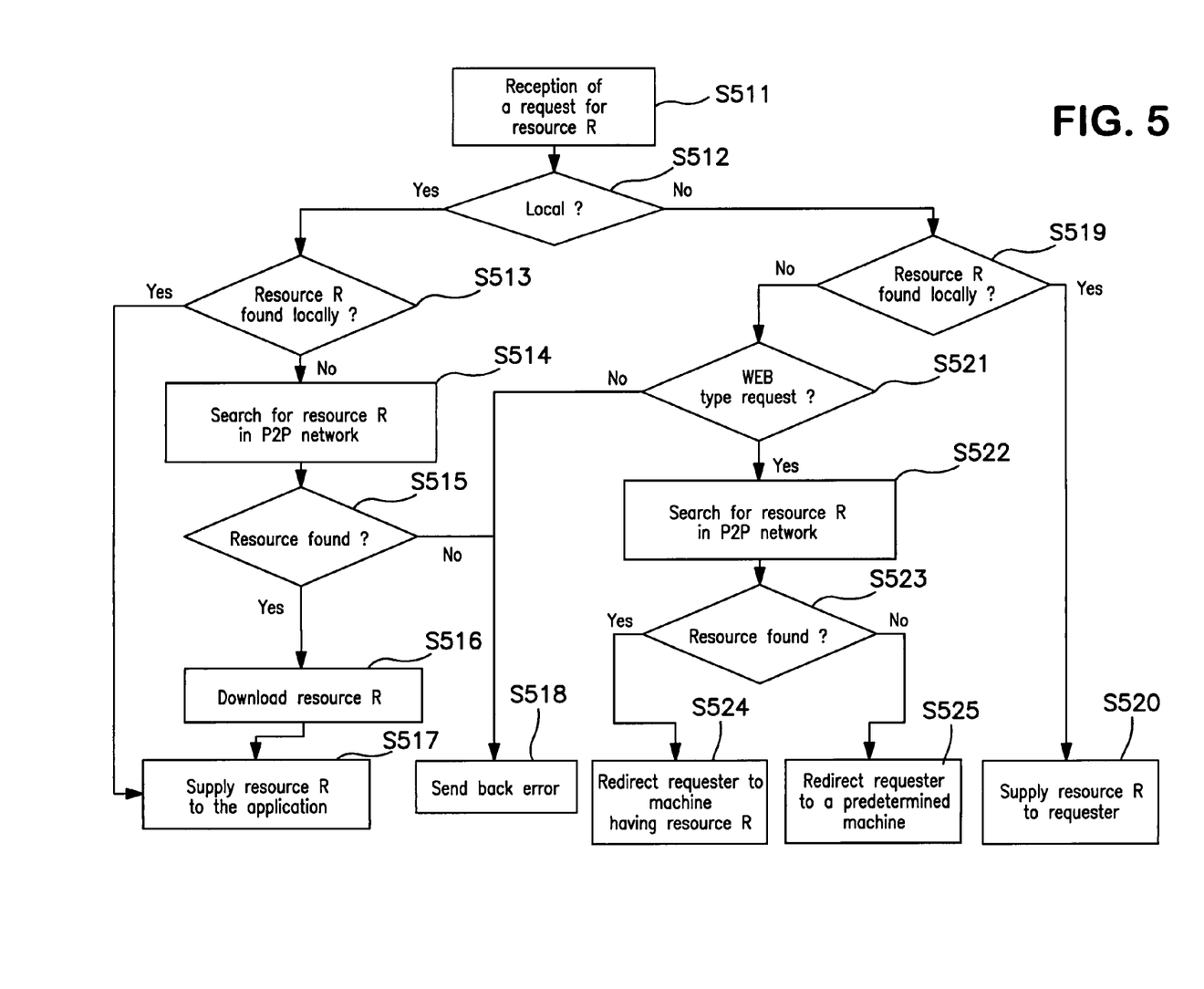
FIG. 5 is a flowchart illustrating the behavior of a local server according to the invention.

At step S403, if the variable indicates that there is a "peer-to-peer" local server active on the machine (the value of the variable is true), then at step S405 the function gives a URL enabling the resource to be accessed via the local server which here has the role of proxy (FIG. 5). The HTML code given by the function would then be:

<A HREF=http://localhost:90/abcde23404-3143492ef-23232>'blue_mountain.jpg'</A> assuming the variable localServerHTTPPort has the value 90.

In another variant, rather than invoking the JavaScript function GetRessourceAddress for each of the references to a digital content, these references may be written in the form of a relative URL. An example of HTML code for a reference may then have the following form:

<A HREF=abcde23404-3143492ef-23232>'blue-
        _mountain.jpg'</A>

Repeated invocation of the JavaScript function GetRessourceAddress for each of the references to a digital content is then advantageously replaced by a single invocation to a JavaScript routine given the task of defining a tag <BASE> in the header of the HTML page 25. This tag defines an absolute URL utilized as basic URL to resolve the relative URLs.

The JavaScript function gives a tag <BASE> linking to a server 24 of proxy/gateway type if there is no "peer-to-peer" local server active on the machine (the variable isLocalServerActif has the value false). The HTML code given by the function is then:

<BASE HREF=http://www.server.com/>

The JavaScript function gives a tag <BASE> linking to a local server 228 if there is an active "peer-to-peer" local server on the machine (the variable isLocalServerActif has the value true). The HTML code given by the function is then:

<BASE HREF=http://localhost:90/> assuming the variable localServerHTTPPort has the value 90.

With reference to FIG. 5, the behavior of the local servers 228 and 218 has been described.

According to the invention when the "peer-to-peer" local server receives a request for a digital content R (S511) it determines at step S512 whether the request comes from a remote application (present on another machine of the communication network) or whether the request comes from a local application (running on the same machine as the server). It determines this information by examining the IP address of the requester and by comparing it to each of its own IP addresses. If two addresses are identical or if the address of the requester is 127.0.0.1 (loopback address), this means that the requester is local, otherwise it is a remote requester.

If the requester is local, the server goes to step S513 and verifies whether the data R sought is not locally present on the disk. If the data is present locally, it is sent to the requester (step S517). If the data is not present locally the server performs a search for the resource on the "peer-to-peer" network using techniques known to the person skilled in the art (step S514). At step S515, if the data is found on the network then the server downloads the data R at step S516, saves it locally in its cache on the disk and sends it back to the requester at step S517. In the opposite case, the server sends back an error to the requester at step S518 to indicate to him that the data is not available.

If the requester is remote, at step S519 the server verifies whether the resource is available locally on its disk.

If the data is available, it is sent back to the requester at step S520. In the opposite case, at step S521 it varifies whether the request is a WEB request coming for example from an Internet navigator (in the form of a URL http://y/x where [x] is the access path to the resource on the machine identified by [y], or else in the form of a particular header in the request) or whether it is a request according to a proprietary "peer-to-peer" protocol.

If it is a WEB request, the server then carries out a search for the data on the "peer-to-peer" network at step S522. The proxy/gateway behavior of machine 24 is again found here.

At step S523, if the resource is localized in the "peer-to-peer" network, the server does not download the resource but on the contrary at step S524 re-directs the requester to the machine having the resource sought using a forwarding order of which a simple form with the HTTP protocol would be:

HTTP/1.1 302 See other URI

Location: http://nnn/zzz

The first key word http/1.1 makes it possible to indicate the type and version of the protocol 302 is a particular error value indicating that the resource is temporarily not available on the server. A comment which may be displayed follows that error code. Location: is the second key word indicating to the Internet navigator to redirect itself to another URI. [nnn] is the address of the machine to contact to obtain the resource and [zzz] is the access path to the resource on the machine [nnn].

At step S523, if the resource is not located on the "peer-to-peer" network, at step S525 the server redirects the requester to a predetermined machine using a forwarding order similar to the preceding one. That predetermined machine is given the task of dealing with the case in which the requested resource is not available by sending back for example a predetermined response inviting the user to renew its request later for example.

If at step S521 it is not a WEB request coming from an Internet navigator but a request coming from a dedicated "peer-to-peer" application the server sends back an error to the requester.

For example the HTML page may have the following content:

```
<HTML>
<HEAD>
<SCRIPT LANGUAGE="VBscript">
<!--
detectableWithVB = False
If ScriptEngineMajorVersion >= 2 then
        detectableWithVB = True
End If
Function detectActiveXControl(activeXControlName)
        on error resume next
        detectActiveXControl = False
        If detectableWithVB Then
           detectActiveXControl =
IsObject(CreateObject(activeXControlName))
        End If
End Function
rem -->
</SCRIPT>
<SCRIPT LANGUAGE="JavaScript">
<!--
var pluginFound = false;
pluginFound = detectActiveXControl('MpActiveXVB.MpRegistry');
alert('MpActiveXVB found = ' + pluginFound);
if (pluginFound)
{
        // Insert reference to activeX in HTML page
        document.write("<OBJECT ID=");
        document.write('\"MpActiveXVB\"');
        document.write("CLASSID=");
        document.write('\"CLSID:443E61FC-4AC1-49EC-A89A-F99EA5EE72A2\">');
        document.writeln("</OBJECT>");
}
// -->
</SCRIPT>
</HEAD>
<BODY>
<SCRIPT LANGUAGE="JavaScript">
<!--
var isLocalServerActif = false;
var localServerHTTPPort = 80;
function CheckServer( )
```

-continued

```
{
  if (pluginFound)
  {
    isLocalServerActif =
MpActiveXVB.GetRegValue("SOFTWARE\\Classes\\CLSID\\
{443E61FC-4AC1-49EC-A89A-F99EA5EE72A2}");
    if(isLocalServerActif == false)
    {
      alert('Server Not Found');
    }
    else
    {
      localServerHTTPPort =
MpActiveXVB.GetRegValue("SOFTWARE\\localserver\\config\\port");
      alert('Server Port Value: ' + localServerHTTPPort);
    }
  }
}
function GetRessourceAddress (imageID, title)
{
  document.writeln("");
  document.writeln("Process the image ID...");
  if(isLocalServerActif == false)
  {
    document.write("<A HREF=http://www.server.com/");
  }
  else
  {
    document.write("<A HREF=http://localhost:");
    document.write(localServerHTTPPort);
    document.write("/");
  }
  document.write(imageID);
  document.write("><IMG SRC=") ;
  document.write(title);
  document.write("BORDER=0 ALT=");
  document.write(title);
  document.writeln("></A>");
}
CheckServer ( );
// -->
</SCRIPT>
<NOSCRIPT>
<H1>No JavaScript</H1>
You see this text if JavaScript is disabled or unimplemented.
</NOSCRIPT>
<SCRIPT LANGUAGE="JavaScript">
GetRessourceAddress ('abcde23404-3143492ef-23232', 'blue_
mountain.jpg');
GetRessourceAddress ('fffffeeeaa-bbe478999-aaaaa', 'red_
mountain.jpg');
</SCRIPT>
</BODY>
</HTML>
```

Among the numerous advantages conferred by the present invention, it is possible to highlight that it is not necessary to adapt the content of the notification according to the capabilities of the recipients, that is to say according to whether they possess the dedicated P2P local application or not. Furthermore, the local or remote access is totally transparent for the user. Similarly, it is not necessary to modify the Internet configuration of the user (in this case the addresses of the proxy server or proxy. Finally, the client devices possessing the P2P application are not obliged to keep their local server active to be able to display the content of a notification received by email, the display of the notification adapting itself automatically depending on the presence/absence of a local server.

The invention claimed is:

1. A method of accessing at least one digital document available on a communication network linking client devices together, said accessing method being implemented on a recipient client device and comprising the following steps:

i) the recipient client device receiving, from a sending client device, a notification indicating the presence of at least one digital document available on the network, said notification comprising one of a page in a markup language to be displayed on a display of the recipient client device, or a notification containing a link to the page in the markup language to be displayed on the display of the recipient client device, the page in the markup language including executable code for detecting whether the recipient client device comprises a local peer-to-peer server application capable of processing requests on digital documents, ii) the recipient client device, upon displaying the page in the markup language, executing the executable code contained in the page in the markup language, the code being executed so as to detect the presence or absence of the local peer-to-peer server application on the recipient client device by detecting the presence of a predetermined program or an extension module forming part of the local peer-to-peer server application, and in a case where the execution results in a detection that the local peer-to-peer server application is present, detecting whether or not the local peer-to-peer server application is in the course of execution in the recipient client device by utilizing the predetermined program or the extension module to retrieve configuration parameters of the local peer-to-peer server application and detecting a predetermined value in the configuration parameters to determine whether or not the application is in the course of execution, and iii) in a case where, as a result of the execution of the code, the local peer-to-peer server application is detected as being present and in the course of execution in the recipient client device, the recipient client device directly accessing the digital document via said local peer-to-peer server application, whereas in a case where, as a result of the execution of the code, an absence of the local peer-to-peer server application is detected, or where the local peer-to-peer server application is detected as being present but is detected as not being in the course of execution, the recipient client device accessing the document via a remote server identified in the received notification.

2. A method according to claim 1, wherein the page in the markup language contains at least one identifier designating the digital document to be accessed, and a remote address designating said remote server.

3. A method according to claim 1, further comprising, in a case where the local peer-to-peer server application is detected as being present but is detected as not being in the course of execution, the recipient client device activating the local peer-to-peer server application according to a chosen executable command.

4. A method according to claim 1, further comprising a step iv) verifying whether or not the digital document is present in a memory managed by said local peer-to-peer server application, and in a case of a negative verification, searching for said digital document on the network, downloading the digital document in a case where the search locates the digital document, and saving the digital document locally before serving it.

5. A method according to claim 2, wherein the page in the markup language is locally adapted so as to access the digital document from the address of said local peer-to-peer server application, the adaptation of the page comprising setting of a linking variable in the markup language to the address of said local peer-to-peer server application.

6. A method according to claim 2, wherein the page in the markup language is locally adapted so as to access the digital document from the address of said remote server, the adaptation of the page comprising setting of a linking variable in the markup language to the address of said remote server.

7. A method according to claim 1, wherein the page is an HTML page, the executable code is script that is embedded in the HTML page, and said code is interpreted at step ii).

8. A method according to claim 5, wherein the local address designating the local peer-to-peer server is determined by the executable code.

9. A method according to claim 1, wherein the executable code included in the page in the markup language calls on predetermined program to detect the local peer-to-peer server, as well as to retrieve the configuration parameters of said local peer-to-peer server.

10. A method according to claim 1, wherein the page in the markup language is notified as an attachment with an email.

11. A method according to claim 1, wherein the page in the markup language is downloaded onto a chosen remote server, and a reference to the downloaded page is sent to the recipient client device with the notification.

12. A method of sharing a digital document available on a communication network linking client devices together, said method comprising the following steps:
  a sending client device generating a page in a markup language, the generated page including at least one identifier of a digital document to be shared, and including executable code for a recipient client device to detect whether the recipient client device comprises a local peer-to-peer server application capable of processing requests on digital documents;
  the sending client device sending to at least one recipient client device a notification indicating the presence of at least one digital document available on the network, said notification comprising one of the generated page in the markup language to be displayed on a display of the recipient client device, or a notification containing a link to the page in the markup language to be displayed on the display of the recipient client device; and
  said recipient client device receiving the notification sent by the sending client device, and upon displaying the page in the markup language, executing the executable code contained in the page in the markup language, the code being executed so as to detect the presence or absence of the local peer-to-peer server application on the recipient client device by detecting the presence of a predetermined program or an extension module forming part of the local peer-to-peer server application, and in a case where the execution results in a detection that the local peer-to-peer server application is present, detecting whether or not the local peer-to-peer server application is in the course of execution in the recipient client device by utilizing the predetermined program or the extension module to retrieve configuration parameters of the local peer-to-peer server application and detecting a predetermined value in the configuration parameters to determine whether or not the application is in the course of execution,
  wherein in a case where, as a result of the execution of the code, the local peer-to-peer server application is detected as being present and in the course of execution in the recipient client device, the recipient client device directly accessing the digital document via said local peer-to-peer server application, and otherwise, in a case where, as a result of the execution of the code, an absence of the local peer-to-peer server application is detected, or where the local peer-to-peer server application is detected as being present but is detected as not being in the course of execution, the recipient client device accessing the document via a remote server identified in the received notification.

13. A sharing method according to claim 12, wherein the page in the markup language contains a remote address designating said remote server.

14. A recipient client device for accessing at least one digital document available on a communication network linking client devices together, said recipient client device comprising:
  receiving means that receives, from a sending client device, a notification indicating the presence of at least one digital document available on the network, said notification comprising one of a page in a markup language to be displayed on a display of the recipient client device, or a notification containing a link to the page in the markup language to be displayed on the display of the recipient client device, the page in the markup language including executable code for detecting whether the recipient client device comprises a local peer-to-peer server application capable of processing requests on digital documents;
  executing means that, upon displaying the page in the markup language, executes the executable code contained in the page in the markup language, the code being executed so as to detect the presence or absence of the local peer-to-peer server application on the recipient device by detecting the presence of a predetermined program or an extension module forming part of the local peer-to-peer server application, and in a case where the execution results in a detection that the local peer-to-peer server application is present, detecting whether or not the local peer-to-peer server application is in the course of execution in the recipient client device by utilizing the predetermined program or the extension module to retrieve configuration parameters of the local peer-to-peer server application and detecting a predetermined value in the configuration parameters to determine whether or not the application is in the course of execution; and
  processing means that, in a case where, as a result of the execution of code by the executing means, the local peer-to-peer server application is detected as being present and in the course of execution in the recipient client device, directly accesses the digital document via said local peer-to-peer server application, whereas in a case where, as a result of the execution of the code, an absence of the local peer-to-peer server application is detected, or where the local peer-to-peer server application is detected as being present but is detected as not being in the course of execution, accessing the digital document via a remote server identified in the received notification.

15. A device according to claim 14, wherein the page in the markup language contains at least one identifier designating the digital document to be accessed, and a remote address designating said remote server.

16. A device according to claim 15, wherein the page in the markup language is adapted so as to access the digital document from the address of said local peer-to-peer server application, and the adaptation comprises setting of a linking variable in the markup language to the address of said local peer-to-peer server application.

17. A device according to claim 15, wherein the page in the markup language is adapted so as to access the digital document from the address of the remote server, and the adaptation comprises setting of a linking variable in the markup language to the address of said remote server.

18. A device according to claim 15, wherein the page is an HTML page, the executable code is script that is embedded in the HTML page and said code is interpreted by the executing means.

19. A device according to claim 14, wherein the page in the markup language is notified as an attachment with an email, the device further comprising an email processing application.

20. A digital document sharing system in a communication network linking client devices together, comprising:
a sending client device, comprising:
generating means that generates a page in a markup language, the generated page including at least one identifier of a digital document to be shared, and including executable code for a recipient client device to detect whether the recipient client device comprises a local peer-to-peer server application capable of processing requests on digital documents; and
sending means that sends to at least one recipient client device, a notification indicating the presence of at least one digital document available on the network, said notification comprising one of the generated page in the markup language to be displayed on a display of the recipient client device, or a notification containing a link to the page in the markup language to be displayed on the display of the recipient client device; and
the recipient client device, comprising:
receiving means that receives the notification sent by the sending means of the sending client device;
display means that displays the page in the markup language; and
execution means that, upon displaying the page in the markup language by the display means, executes the executable code contained in the page in the markup language, the code being executed so as to detect the presence or absence of the local peer-to-peer server application on the recipient client device by detecting the presence of a predetermined program or an extension module forming part of the local peer-to-peer server application, and in a case where the execution results in a detection that the local peer-to-peer server application is present, detecting whether or not the local peer-to-peer server application is in the course of execution in the recipient client device by utilizing the predetermined program or the extension module to retrieve configuration parameters of the local peer-to-peer server application and detecting a predetermined value in the configuration parameters to determine whether or not the application is in the course of execution,
wherein in a case where, as a result of the execution of the code, the local peer-to-peer server application is detected as being present and in the course of execution in the recipient client device, the recipient client device directly accesses the digital document via said local peer-to-peer server application, and otherwise, in a case where, as a result of the execution of the code, an absence of the local peer-to-peer server application is detected or where the local peer-to-peer server application is detected as being present but is detected as not being in the course of execution, the recipient client device accesses the digital document via a remote server identified in the received notification.

21. A sharing system according to claim 20, wherein the page in the markup language contains at a remote address designating said remote server.

22. A computer-readable storage medium on which is stored a computer program, said program comprising instructions enabling the implementation of a processing method according to claim 1.

* * * * *